United States Patent [19]

Takasaki

[11] 4,262,263
[45] Apr. 14, 1981

[54] VARIABLE EQUALIZER

[75] Inventor: Yoshitaka Takasaki, Tokorozawa, Japan

[73] Assignee: Hitachi, Ltd., Japan

[21] Appl. No.: 36,973

[22] Filed: May 8, 1979

[30] Foreign Application Priority Data

May 12, 1978 [JP] Japan .................. 53/55558

[51] Int. Cl.³ ............... H03F 3/04; H03H 5/00
[52] U.S. Cl. ............................ 330/304; 333/28 R
[58] Field of Search .................. 333/28 R; 330/304

[56] References Cited

U.S. PATENT DOCUMENTS

| 4,004,253 | 1/1977 | Takasaki et al. | 333/28 R |
| 4,080,580 | 3/1978 | Takasaki et al. | 333/28 R |

Primary Examiner—Harold A. Dixon
Attorney, Agent, or Firm—Craig and Antonelli

[57] ABSTRACT

A variable equalizer for compensating for the frequency characteristics of transmission media, comprising a plurality of variable circuits which are connected in cascade to an input terminal and which have the same variation characteristics, coefficient circuits which receive input and output signals of the variable circuits as inputs thereof and which multiply the inputs by coefficients, a plurality of impedance circuits which receive as inputs thereof signals with outputs of the coefficient circuits selectively combined and which have frequency-dependencies, and an adder circuit which adds outputs of the impedance circuits to provide an equalized signal as its output. No feedback circuit is required in the construction, and the plurality of variable circuits are constructed of the same circuits. Therefore, a variable equalizer which is capable of high-speed operation, whose circuit arrangement is simple and whose compensation accuracy is high is realized.

3 Claims, 4 Drawing Figures

VARIABLE EQUALIZER

BACKGROUND OF THE INVENTION

(1) Field of the Invention

This invention relates to a variable equalizer. More particularly, it relates to a circuit which compensates for the fluctuations of the frequency characteristics of transmission media such as coaxial cable and pair cable, the fluctuations being dependent upon or ascribable to the lengths of the transmission media and other factors.

(2) Description of the Prior Art

As the variable equalizer of this type, there has heretofore been used the so-called Bode type variable equalizer with which the arrangement of a circuit device is simple. The transfer function of the Bode type variable equalizer is expressed by:

$$F(x) = \frac{x + Y}{xY + 1}$$

Here, x denotes a variable value which is independent of the frequency, and Y a function which has a predetermined frequency characteristic. In order to realize with an integrated circuit the variable equalizer which has such a transfer function, a feedback circuit is required. Therefore, the variable equalizer is not suitable as a circuit of high operating speed. Recently, owing to the progress of a communication system using optical fibers, variable equalizers are often operated in a very broad band. Especially for the equalizer requiring such a broad-band and high-speed operation, the Bode type variable equalizer in the prior art is not appropriate.

A variable equalizer which employs no feedback circuit has been known (U.S. Pat. No. 3,652,952). The concrete circuit arrangement thereof, however, requires circuits whose variation characteristics differ from each other and have a predetermined relation therebetween. For the reasons that the realization of the circuits at high precision is difficult and that the versatility in the circuit design is limited, it is difficult in principle to reduce compensation errors.

SUMMARY OF THE INVENTION

It is accordingly an object of this invention to realize a variable equalizer which is capable of high-speed operation and whose circuit arrangement is comparatively simple. Another object of this invention is to realize a variable equalizer which has a high compensation accuracy and which does not need any feedback circuit.

In order to accomplish the objects, this invention consists in constructing the circuit arrangement of a variable equalizer as follows:

The variable equalizer comprises one or a plurality of first circuits having the same variation characteristics which is/are connected in cascade to an input terminal; coefficient circuits which receive input and output signals of the first circuits as inputs and which multiply the inputs by coefficients; a plurality of second circuits which receive as inputs, output signals of the coefficient circuits selectively combined and which have frequency characteristics; and an adder which adds outputs of the plurality of second circuits.

As stated above, no feedback circuit is required in the circuit arrangement of this invention, so that the variable equalizer is adapted for a high-speed operation. Since all the plurality of circuits having the variation characteristics exhibit the same characteristics, the circuit arrangement becomes simple.

The above-mentioned objects and features and other objects and features of this invention will become more apparent from the following detailed description taken with reference to the drawings.

DESCRIPTION OF THE PREFERRED EMBODIMENTS

Figure 1:
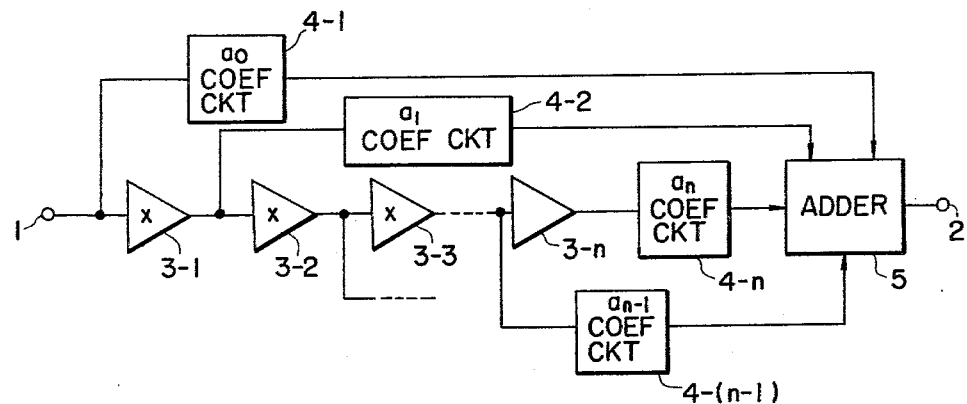
FIG. 1 is a block diagram of a variable equalizer embodying the present invention.

FIG. 1 shows a block diagram of the general construction of a variable equalizer according to this invention.

Referring to the figure, numerals 1 and 2 designate an input terminal and an output terminal of the equalizer, respectively. 3-1, 3-2, . . . and 3-n indicate variable circuits which are independent of frequencies and have the same variation characteristics, and which are first circuits connected in series with the input terminal. 4-1, 4-2, . . . and 4-n indicate coefficient circuits which receive inputs and outputs of the first circuits as inputs thereof. Respective outputs of the coefficient circuits are added by an adder 5, and the sum is led to the output terminal.

In the actual circuit arrangement, the coefficient circuits 4-1, 4-2, . . . are partially formed in common as in an embodiment to be stated later, and they are constructed of resistance elements and frequency-dependent impedance circuits.

The variation characteristic, i.e., transfer function $F(x)$ of the above circuit is expressed by:

$$F(x) = a_n x^n + a_{n-1} x^{n-1} + \ldots\ldots + a_0 \qquad (1)$$
$$= \sum_{i=0}^{n} a_i x^i$$

Here, $a_n, a_{n-1}, \ldots a_i \ldots$ and $a_0$ denote the coefficients of the respective coefficient circuits 4-n, 4-(n−1), . . . 4-i . . . and 4-1, and x denotes a variable value which is determined by the variable circuit 3 (and which may be considered the gain of the circuit).

Since, as stated above, no feedback circuit is constructed in the fundamental circuit arrangement, the variable equalizer operates even in response to high-speed signals without causing increase of errors and oscillations.

Further, since the first circuits 3-1, 3-2, . . . and 3-n having the variation characteristics are constructed of the identical circuit arrangement, the design and fabrication are facilitated. By way of example, variable resistors which constitute the plurality of variable circuits can be controlled in common by an identical control current or voltage.

Figure 2:
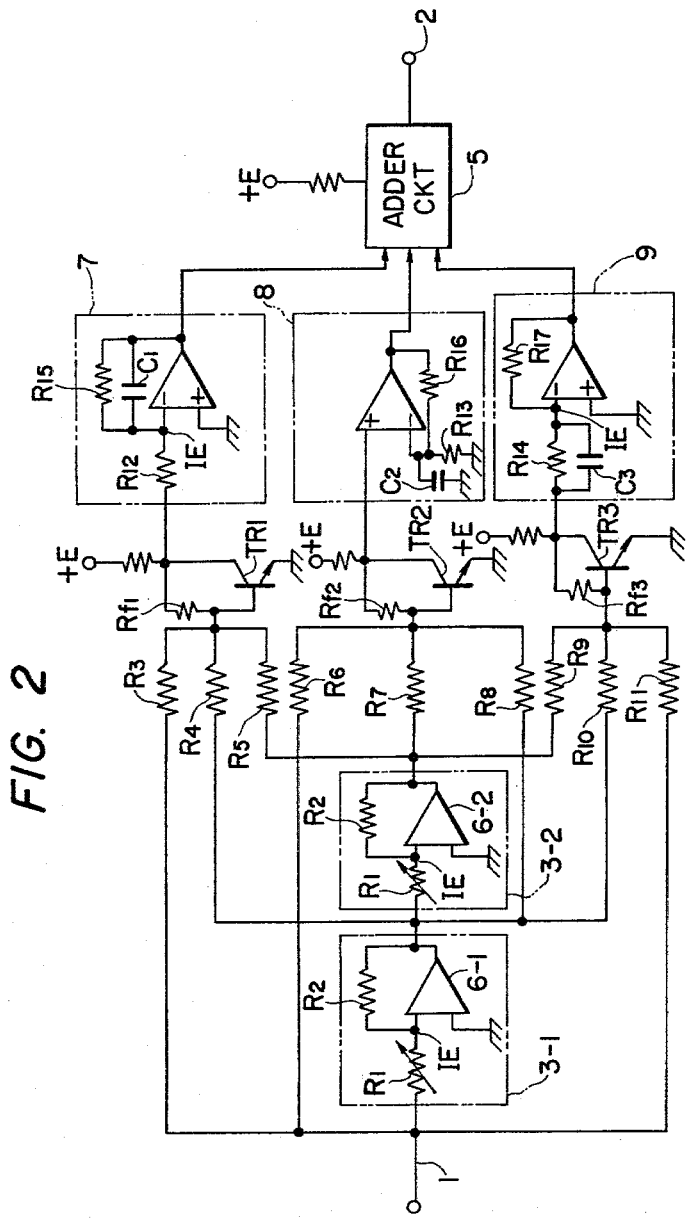
FIG. 2 is a schematic diagram of a variable equalizer embodying the present invention.

FIG. 2 is a circuit diagram of an embodiment of the variable equalizer according to this invention which has been made on the basis of the above principle and whose transfer function is given by the quadratic expression of the variable x. The transfer function F(x) of this variable equalizer is expressed by:

$$F(x) = a_2 x^2 + a_1 x + a_0$$

where the coefficients $a_2$, $a_1$ and $a_0$ are respectively set at:

$$a_2 = 4.167\ Y^{0.9} - 6.67\ Y^{-0.1} + 2.5\ Y^{-0.95}$$

$$a_1 = -5.417\ Y^{0.9} + 6.67\ Y^{-0.1} - 1.25\ Y^{-0.95}$$

$$a_0 = 1.5\ Y^{0.9} - 0.6\ Y^{-0.1} + 0.1\ Y^{-0.95}$$

In FIG. 2, parts assigned the same numerals as in FIG. 1 are the same functional circuits. The circuits 3-1 and 3-2 are the same circuits, and each is composed of a variable resistor $R_1$, a fixed resistor $R_2$ and a differential amplifier 6-1 or 6-2.

In case where the gain of the differential amplifier is sufficiently high, the potential of an input end (virtual ground) can be regarded as zero. Accordingly, the transfer function of the circuit becomes $$\frac{-R_2}{R_1}\ (= -x)$$

the variable range of which is set at from 0 to $-1$. As illustrated in the figure, inputs and outputs of the variable circuits are connected to the bases of transistors $TR_1$-$TR_3$ through resistance elements $R_3$-$R_{11}$. Letting $v_{in}$ denote the input potential of the resistance element $R_3$-$R_{11}$ and $v_o$ denote the output potential of the transistor, $$v_o = \frac{R_f}{R_N} v_{in}.$$

Here, $R_f$ denotes the resistance value of a resistor $R_{f1}$, $R_{f2}$ or $R_{f3}$, and $R_N$ denotes the resistance value of the resistor $R_3$, $R_4$ ... or $R_{11}$.

Outputs of the transistors $TR_1$, $TR_2$ and $TR_3$ are respectively applied to circuits 7, 8 and 9 which have frequency-dependent impedances. The impedances of the respective circuits 7, 8 and 9 are $Y^{0.9}$, $-Y^{0.1}$ and $Y^{-0.95}$.

Outputs of the respective circuits 7, 8 and 9 are applied to the adder 5, and the equalized output is provided from the output terminal 2.

Letting $v_i$ denote an input voltage to the input terminal 1, the input voltages of the resistors $R_3$, $R_4$ ... and $R_{11}$ become $v_i$, $-x\ v_i$, $x^2\ v_i$, $v_i$, $x^2\ v_i$, $-x\ v_i$, $x^2\ v_i$, $-x\ v_i$ and $v_i$ respectively. Supposing that the ratios between the resistance $R_{f1}$ and the resistances $R_3$, $R_4$ and $R_5$ are 1.5, 5.417 and 4.167 respectively, that the ratios between the resistance $R_{f2}$ and the resistances $R_6$, $R_7$ and $R_8$ are 0.6, 6.67 and 6.67 respectively, and that the ratios between the resistance $R_{f3}$ and the resistances $R_9$, $R_{10}$ and $R_{11}$ are 2.5, 1.25 and 0.1 respectively, then the output of the adder 5 becomes:

$$\{(4.167\ Y^{0.9} - 6.67\ Y^{0.1} + 2.5\ Y^{-0.95})\ x^2 + (-5.417$$
$$Y^{0.9} + 6.67\ Y^{-0.1} - 1.25\ Y^{-0.95})x + (1.5\ Y^{0.9} - 0.6$$
$$Y^{-0.1} + 0.1\ Y^{-0.95})\}v_i$$

Accordingly, the expression previously stated can be realized.

When numerical values are set so that the above-mentioned expression in the case based on the quadratic expression may hold, errors can be confined within $\pm 1$ dB with respect to a variable range of Y of $\pm 18$ dB. (By the way, with a prior-art variable equalizer, errors are $\pm 2$ dB with respect to the same variable range of Y.)

Although, in the above, this invention has been explained as to the case where the variation characteristic is of the second order, it is obvious that the invention is not restricted to the present embodiment, and it is natural that errors are further reduced by making the order higher. Also as to the circuit arrangement, it is to be understood that the invention is not restricted to the embodiment. By way of example, the transistors $TR_1$, $TR_2$ and $TR_3$ may well be included in the circuits 7-9.

Figure 3A:
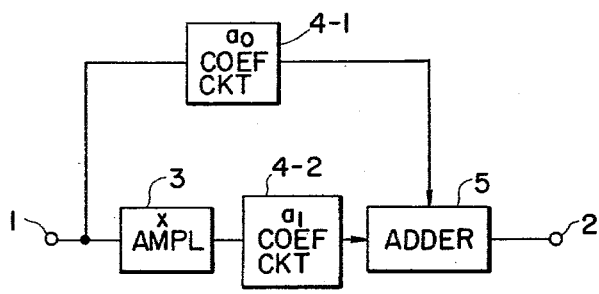
FIG. 3A is a block diagram of a variable equalizer having the first-order transfer function embodying the present invention.
Figure 3B:
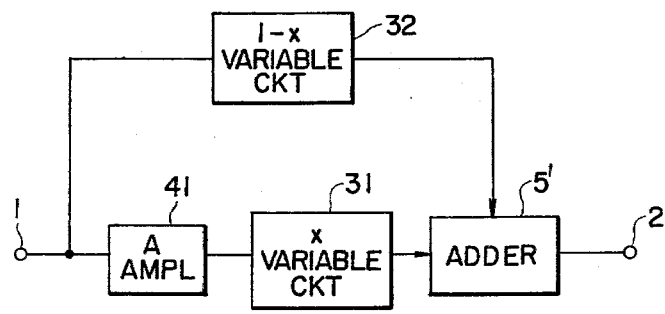
FIG. 3B is a block diagram of a conventional variable equalizer.

FIGS. 3A and 3B are diagrams which show the constructions of a variable equalizer of the first order according to this invention and a variable equalizer of the first order in a prior art, respectively.

FIG. 3A illustrates a case where the principle is the same as in the variable equalizer of FIG. 1 and where the order is the lowest. That is, the embodiment is such that the variable circuits 3-2 to 3-n and the coefficient circuits 4-n and 4-(n−1) in FIG. 1 are removed. The transfer function of the embodiment is expressed by $a_1 x + a_0$. The circuit of FIG. 3B is the arrangement of the variable equalizer which is disclosed in U.S. Pat. No. 3,652,952 stated previously. The coefficient of a coefficient circuit 41 is denoted by A, and variable circuits are two circuits 31 and 32 respectively having variable values x and $1-x$. The transfer function becomes A $x+(1-x)$. Accordingly, the orders are the first in both the cases. Nevertheless, in determining the coefficients, the degree of freedom is 2 with the embodiment in FIG. 3A, and it is 1 with the prior art in FIG. 3B. In making errors smaller, the circuit of FIG. 3A according to this invention is more advantageous. Further, the embodiment in FIG. 3A suffices with the single variable circuit, whereas the prior art in FIG. 3B requires the two variable circuits. Moreover, the two variable circuits are different from each other. Therefore, the case illustrated in FIG. 3A is much more advantageous in both the design and the control.

What is claimed is:

1. A variable equalizer comprising, in combination, one variable circuit or a plurality of cascaded variable circuits having the same variable value x, said variable circuit or circuits being connected to an input terminal; a plurality of coefficient circuits which receive input and output signals of the variable circuits as inputs thereof and which multiply said inputs by coefficients $a_i$ (i=0, 1, ... and n where n is the number of the variable circuits); and an adder circuit which adds outputs of the respective coefficient circuits, wherein a transfer function of said variable equalizer is set at:

$$\sum_{i=0}^{n} a_i x^i$$

2. A variable equalizer according to claim 1, wherein said coefficient circuits comprise resistance elements which are connected to inputs and outputs of said variable circuits, and one or more frequency-dependent circuits which receive as inputs thereof outputs of said resistance elements selectively combined.

3. A variable equalizer according to claim 1, wherein the variable circuit is constructed of a differential amplifier having two input terminals and an output terminal, one of the two input terminals is grounded, and the other input terminal is connected to the output terminal through a resistor and connected to either said input terminal of said variable equalizer or the output terminal of another variable circuit through a variable resistor.

* * * * *